United States Patent
Garel et al.

(10) Patent No.: US 10,501,354 B2
(45) Date of Patent: Dec. 10, 2019

(54) PROCESS FOR TREATING EFFLUENTS FROM THE PRODUCTION OF AN AROMATIC COMPOUND DERIVED FROM A DIHYDROXYLATED BENZENE

(71) Applicant: RHODIA OPERATIONS, Paris (FR)

(72) Inventors: Laurent Garel, Lyons (FR); Bertrand Satier, Jardin (FR)

(73) Assignee: RHODIA OPERATIONS, Paris (FR)

( * ) Notice: Subject to any disclaimer, the term of this patent is extended or adjusted under 35 U.S.C. 154(b) by 1016 days.

(21) Appl. No.: 14/385,038

(22) PCT Filed: Mar. 15, 2013

(86) PCT No.: PCT/EP2013/055453
§ 371 (c)(1),
(2) Date: Sep. 12, 2014

(87) PCT Pub. No.: WO2013/135885
PCT Pub. Date: Sep. 19, 2013

(65) Prior Publication Data
US 2015/0034551 A1  Feb. 5, 2015

(30) Foreign Application Priority Data

Mar. 16, 2012 (FR) .................... 12 52415

(51) Int. Cl.
| | | |
|---|---|---|
| *C02F 9/00* | (2006.01) | |
| *C02F 1/52* | (2006.01) | |
| *C02F 1/72* | (2006.01) | |
| *C02F 11/10* | (2006.01) | |
| *F23G 5/04* | (2006.01) | |
| *C02F 101/10* | (2006.01) | |
| *C02F 103/36* | (2006.01) | |
| *C02F 1/04* | (2006.01) | |
| *C02F 1/28* | (2006.01) | |
| *C02F 1/32* | (2006.01) | |
| *C02F 3/00* | (2006.01) | |
| *C02F 101/30* | (2006.01) | |

(52) U.S. Cl.
CPC .......... *C02F 9/00* (2013.01); *C02F 1/52* (2013.01); *C02F 1/725* (2013.01); *C02F 11/10* (2013.01); *F23G 5/04* (2013.01); *C02F 1/048* (2013.01); *C02F 1/283* (2013.01); *C02F 1/32* (2013.01); *C02F 1/722* (2013.01); *C02F 3/00* (2013.01); *C02F 2101/101* (2013.01); *C02F 2101/30* (2013.01); *C02F 2101/40* (2013.01); *C02F 2103/36* (2013.01); *C02F 2209/06* (2013.01); *C02F 2305/026* (2013.01); *Y02W 10/40* (2015.05)

(58) Field of Classification Search
None
See application file for complete search history.

(56) References Cited

U.S. PATENT DOCUMENTS

| 4,352,886 A | * | 10/1982 | Pillis ................. C02F 3/1231 210/601 |
| 7,335,246 B2 | * | 2/2008 | Huling ................ C02F 1/283 95/141 |

FOREIGN PATENT DOCUMENTS

| CN | 102126777 A | 7/2011 |
| CN | 102134131 A | 7/2011 |

* cited by examiner

*Primary Examiner* — Michael J Felton
*Assistant Examiner* — Katherine A Will
(74) *Attorney, Agent, or Firm* — Osha Liang LLP

(57) ABSTRACT

A process for treating an aqueous solution (A) derived from a method of producing a compound with the formula (I): (I) wherein R1 and R2 are identical or different and are chosen from among hydrogen and C1-C5 alkyl, wherein R1 and R2 together form a methylene group, and wherein R3, R4, R5 and R6, which are independently identical or different, are chosen from among: a hydrogen atom, a hydroxy group (—OH), an alkoxy group (—OR), an alcohol group (—ROH), an aldehyde group (—CHO), a ketone group (—C(═O)R), an acid group (—COOH), a nitrile group (—CN), a C1-C6 alkyl chain, linear or branched, saturated or unsaturated, potentially comprising one or a plurality of substitutes in a terminal or lateral position or one or more functions in said alkyl chain, R being a C1-C5 alkyl, wherein the aqueous solution (A) comprises at least one sulfate salt $SO_4^{2-}$ (S) rendered soluble and at least one aromatic organic compound (O) formed during the method for producing the compound (I), and wherein the process comprises at least one step (i) of recovering a solid sulfate salt (S) in an at least partially anhydride form separately from the aqueous solution (A).

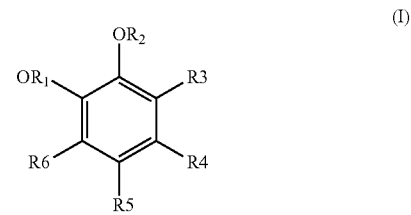

(I)

16 Claims, No Drawings

PROCESS FOR TREATING EFFLUENTS FROM THE PRODUCTION OF AN AROMATIC COMPOUND DERIVED FROM A DIHYDROXYLATED BENZENE

CROSS-REFERENCE TO RELATED APPLICATIONS

The present application is a U.S. national stage entry under 35 U.S.C. § 371 of International Application No. PCT/EP2013/055453 filed Mar. 15, 2013, which claims priority to French Application No. 12.52415 filed on Mar. 16, 2012, this application being herein incorporated by reference for all purposes.

The invention relates to a process for treating an aqueous solution (A) derived from a process for producing an aromatic compound derived from a dihydroxylated benzene. The invention relates in particular to a process for treating an aqueous solution (A) derived from a process for producing vanillin, ethylvanillin, or a derivative thereof. The invention relates more particularly to the treatment of said aqueous solution (A), which comprises at least one dissolved sulfate salt $SO_4^{2-}$ (S) and at least one aromatic organic compound (O) formed during the process for producing an aromatic compound derived from a dihydroxylated benzene, and in particular vanillin or ethylvanillin or a derivative thereof, with the recovery of a solid sulfate salt (S) in at least partially anhydrous form separately from the aqueous solution (A), in particular to upgrade it.

TECHNICAL BACKGROUND

A process for the industrial production of dihydroxylated benzene derivatives, and in particular of vanillin, ethylvanillin or a derivative thereof, generates a certain number of effluents, especially including aqueous effluents comprising at least one aromatic organic compound and at least one sulfate salt.

The aqueous effluents from a process for producing dihydroxylated benzene derivatives, and in particular vanillin or ethylvanillin or a derivative thereof, may be purified by precipitating the sulfate salt(s), for example by lowering the temperature for crystallizing the sulfate salt(s) and separating the sulfate salt(s) from the effluents.

At the present time, the sulfate salts are generally not recovered. The industrial effluents still generally contain from 2% to 15% of sulfate salt. The existing processes need to be improved from an ecological and economic viewpoint.

OBJECTIVE OF THE INVENTION

The main objective of the invention is thus to provide an industrial process for treating aqueous effluents derived from a process for producing dihydroxylated benzene derivatives, and in particular vanillin, ethylvanillin or a derivative thereof, which is more ecological and more economic.

One objective of the invention is especially to provide a process for obtaining an aqueous solution comprising less than 2% and more preferably less than 1% by weight of sulfate salt.

For example, the effluents from such a process may be treated by simply precipitating the sulfate salt(s) in a conventional manner, i.e. by reducing the temperature of a dilute aqueous solution of sulfate salt until the salt precipitates out in solid form. However, when the salt is derived from an industrial production of dihydroxylated benzene derivatives, and in particular of vanillin, ethylvanillin or a derivative thereof, the impurities, especially of aromatic organic type, prevent commercialization of the sulfate salt without a further purification treatment and prevent the discharging an aqueous effluent that satisfies the standards in force, which it is desired to avoid in the present invention.

Thus, the invention is directed toward improving the upgrading of the sulfate salt(s), especially by reducing the impurities.

SUMMARY OF THE INVENTION

The inventors have demonstrated that the sulfate salts present in the effluents from a process for synthesizing dihydroxylated benzene derivatives, and in particular vanillin, ethylvanillin or a derivative thereof, can be upgraded in an improved manner by directly recovering at least one solid sulfate salt in partially anhydrous form, and preferably in totally anhydrous form.

The inventors have found in fact that, in a process for producing dihydroxylated benzene derivatives, and in particular vanillin, ethylvanillin or a derivative thereof, the sulfate salts cannot be correctly upgraded without obtaining a solid sulfate salt in partially anhydrous form, since the salt otherwise comprises organic impurities that are particularly difficult to remove. In particular, it is desired to avoid producing the hydrated form of the sulfate salt, and specifically to avoid the decahydrate form of the sodium sulfate salt.

The present invention relates to a process for treating an aqueous solution (A) derived from a process for producing a compound of formula (I):

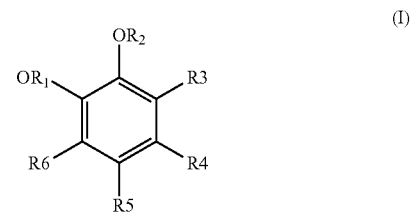

in which R1 and R2 are identical or different and chosen from hydrogen and C1-C5 alkyl, or R1 and R2 together form a methylene group, and in which R3, R4, R5 and R6, which may be identical or different, are independently chosen from: a hydrogen atom, a hydroxyl group (—OH), an alkoxy group (—OR), an alcohol group (—ROH), an aldehyde group (—CHO), a ketone group (—C(=O)R), an acid group (—COOH), a nitrile group (—CN), a linear or branched, saturated or unsaturated C1-C6 alkyl chain, optionally comprising one or more substituents in an end or side position or one or more functions in said alkyl chain, R being a C1-C5 alkyl, characterized in that the aqueous solution (A) comprises at least one dissolved sulfate $SO_4^{2-}$ salt (S) and at least one aromatic organic compound (O) formed during the process for producing compound (I), and characterized in that the process comprises at least one step (i) of recovery of a solid sulfate salt (S) in at least partially anhydrous form separately from the aqueous solution (A).

Preferably, R3, R4, R5 and R6 are not simultaneously a hydrogen atom.

As substituents of an alkyl chain R3, R4, R5 and/or R6, mention may be made of hydroxyl (—OH), alkoxy (—OR), alcohol (—ROH), aldehyde (—CHO), ketone (C(=O)R), acid (COOH) and nitrile (—CN) groups.

As function in a chain R3, R4, R5 and/or R6, a functional group included in the chain R3 is intended; mention may be made of the following functions: ether, ketone, ester, amine, amide, azo, nitrile, thioether, disulfide and thio ketone.

Vanillin, ethylvanillin and derivatives thereof satisfy formula (I) described above.

For the purposes of the invention, it is also possible to speak of a process for purifying a sulfate salt in solid form, a process for purifying effluents from a process for preparing dihydroxylated benzene derivatives, and in particular vanillin, ethylvanillin or a derivative of formula (I), or alternatively a process for upgrading sulfate, especially derived from an industrial process for preparing dihydroxylated benzene derivatives, and in particular vanillin, ethylvanillin or a derivative of formula (I). Thus, when reference is made to a treatment process, the invention also covers these various types of process, independently.

DETAILED DESCRIPTION OF THE INVENTION

The invention relates in particular to a process for treating an aqueous solution derived from a process for producing a compound of formula (I) and in particular vanillin, ethylvanillin or a derivative, said solution comprising at least one solubilized sulfate $SO_4^{2-}$ salt and at least one aromatic organic compound, in order finally to recover an aqueous solution in which the sulfate salt and the aromatic organic compounds have been removed, and to upgrade the solid sulfate salt obtained in at least partially anhydrous and preferably totally anhydrous form.

According to one variant, R1 and R2 are a hydrogen atom.

According to another variant, R1 is a hydrogen atom and R2 is alkyl, and in particular methyl, ethyl, propyl, isopropyl, n-butyl, sec-butyl, tert-butyl or pentyl.

According to another variant, R2 is a hydrogen atom and R1 is alkyl, and in particular methyl, ethyl, propyl, isopropyl, n-butyl, sec-butyl, tert-butyl or pentyl.

According to another variant, R1 and R2 are alkyl, and in particular methyl, ethyl, propyl, isopropyl, n-butyl, sec-butyl, tert-butyl or pentyl.

According to another variant, R3, R4, R5 and R6, which may be identical or different, are independently chosen from: alkyl, and in particular methyl, ethyl, propyl, isopropyl, n-butyl, sec-butyl, tert-butyl, pentyl, hexyl, methylene, ethylene, propylene, butylene, pentylene or hexylene, the double bond possibly being terminal or included in the alkyl chain, between carbons C1-C2, C2-C3, C3-C4 or C4-O5. These various alkyl and alkene groups may comprise one or more substituents in an end or side position and/or one or more functions, especially such as those mentioned previously.

According to one variant, R3, R5 and R6 are each a hydrogen atom and R1, R2 and R4 are as defined in the invention, including all of the variants, preferences and embodiments.

The vanillin or ethylvanillin derivatives in particular cover the compounds of formula (I) in which R3, R5 and R6 are each a hydrogen atom, and R4 is an aldehyde group (CHO), with R1 and R2 as defined in the invention, including all of the variants, preferences and embodiments.

The aromatic organic compounds (O) are typically co-products, impurities or intermediates of the reaction or sequence of reactions producing the compound of formula (I) and are therefore other than vanillin, ethylvanillin or the derivative of formula (I), which is generally already recovered during a step preceding the process that is the subject of the present invention. The aromatic organic compounds (O) are generally products of complex structure and dimers or oligomers of compound (I). Moreover, reference is made to the presence of at least one aromatic organic compound, but it is obvious that in an industrial process several aromatic organic compounds are present in the effluents. This is why reference is made more generally to aromatic organic compounds, although this also covers the theoretical variant in which only one aromatic organic compound would be present in the effluent. The effluents may contain vanillin, ethylvanillin or a derivative of formula (I), but generally in negligible amount.

The processes for the industrial synthesis of vanillin especially use as starting compound glyoxylic acid and guaiacol, and the processes for the industrial synthesis of ethylvanillin especially use glyoxylic acid and guethol as starting compound.

In the present description, reference is made for simplicity to the recovery of a sulfate salt, but the invention covers the recovery of the sulfate salts present if several sulfate salts are present in the effluents. According to one variant, these various sulfate salts may be recovered separately in so far as their solubility limits in the aqueous solution are different. Some salts or all of the salts may be recovered together, according to another variant.

Typically, the sulfate salt is in sodium or potassium sulfate form, but the invention also covers all the other sulfate salts that may be solid and at least partially anhydrous at room temperature. These may be sulfate salts of ammonium or of an alkali metal or alkaline-earth metal, and in particular of lithium, cesium, calcium, magnesium, barium, sodium or potassium, or any mixture thereof.

Generally, the effluents are aqueous solutions. This is why reference is made to an aqueous solution (A) in the present description, but this covers an aqueous solution comprising various organic compounds, derived in particular from the production of dihydroxylated benzene derivatives, and in particular of vanillin, ethylvanillin or derivatives thereof of formula (I). The aqueous solution may be a one-phase or liquid/liquid two-phase solution, and may optionally contain solids in suspension, and in particular the solid sulfate salt.

According to one variant, step (i) of recovery of the solid sulfate salt (S) in at least partially anhydrous form comprises the concentration (ia) of the sulfate ions in said aqueous solution (A) by removal or separation of at least some of the water from the aqueous solution (A), said concentration (ia) being performed at a temperature above the solubility limit temperature of the sulfate salt in the aqueous solution (A), and preferably at a temperature above 40° C., preferably above 45° C. and more preferably above 50° C.

According to a preferred embodiment, the temperature of the aqueous solution (A) is at a temperature before treatment, known as the production end temperature, of greater than 40° C., preferably greater than 50° C. and more preferably greater than 60° C., and the concentration according to step (ia) is performed at the production end temperature or at a neighboring temperature, such as a temperature equal to the production end temperature plus or minus 20° C. and preferably plus or minus 10° C., but greater than 40° C.

In particular, the aqueous solution (A) may be recovered at the end of the process for producing compound (I) and may thus be advantageously treated at the production temperature, known as the production end temperature or at a neighboring temperature, such as a temperature equal to the production end temperature plus or minus 20° C. and preferably plus or minus 10° C.

Advantageously, step (i) of recovery of the solid sulfate salt (S) in at least partially anhydrous form comprises: (ia) concentration of the sulfate ions in the aqueous solution (A), (ib) crystallization/precipitation of the solid sulfate salt (S) in at least partially anhydrous form, (ic) separation of the at least partially anhydrous solid sulfate salt (S) from the aqueous solution (A), and (id) recovery of the at least partially anhydrous solid sulfate salt (S), said steps (ia), (ib) and (ic) being performed at a temperature above the solubility limit temperature of the sulfate salt in the aqueous solution (A).

Preferably, the concentration (ia) of the sulfate ions is performed by evaporating off at least some of the water from the aqueous solution (A).

Advantageously, the crystallization/precipitation (ib) may also be performed at the production end temperature of the aqueous solution (A) or at a neighboring temperature, such as a temperature equal to the production ended temperature plus or minus 20° C. and preferably plus or minus 10° C.

According to one embodiment, the separation and recovery (ic) is performed by filtration. This filtration may be performed by solid/liquid filtration on a membrane, a metallic filter medium or a woven textile organic filter medium, enabling the solid sulfate salt (S) to be retained.

According to a preferred variant, the sulfate salt is obtained in anhydrous form, for example in anhydrous sodium sulfate form.

The process of the invention may advantageously generate from 2 to 15 kg of salts, and advantageously of anhydrous solid sodium sulfate salt, per 100 L of treated effluent.

According to a preferred variant, the process of the invention comprises at least one step (ii) of separation or removal of the aromatic organic compounds (O) from the aqueous solution (A), said process comprising the implementation at least once of said step (i) and of said step (ii), independently of the order, in order to at least partially separate the organic compounds (O) and the sulfate salt $SO_4^{2-}$ (S) from the aqueous solution (A).

One aim is to remove a maximum amount of aromatic organic compounds (O) and of sulfate salt (S) from the aqueous solution (A). The invention also covers the production of an aqueous solution in which the aromatic organic compounds (O) and/or the sulfate salt(s) (S) would be simply partially removed or recovered. Mention is also made of a solution without aromatic organic compounds or without sulfate ions, or alternatively of a solution in which the aromatic organic compounds and/or the sulfate ions are "removed". These meanings are equivalent to those given above and are therefore in no way limited to a total absence of these substances in the aqueous solution. On the contrary, the aromatic organic compounds and/or the sulfate ions may still be present in large amounts in the aqueous solution, after treatment. However, the aim of these steps is to suitably separate the aromatic organic compounds (O) and/or the sulfate salt(s) (S) from the aqueous solution (A).

The term "solution (A-S)" means a solution which has undergone a step of at least partial separation of the sulfate ions (S) initially present in the aqueous solution (A). A solution (A-S) in which the sulfate ions (S) are present to less than 2% by weight relative to the total weight of the solution is preferred.

The term "solution (A-O)" means a solution which has undergone a step of at least partial separation or removal of the aromatic organic compounds (O) initially present in the aqueous solution (A). A solution (A-O) having a COD (chemical oxygen demand) of less than 10 g per liter is preferred. The process according to the present invention can satisfy such a requirement.

The term "solution (A-O—S)" means a solution which has undergone a step of at least partial separation or removal of the aromatic organic compounds (O) and of the sulfate ions (S), independently of their order. This solution is generally a solution of water that is more less purified.

Thus, according to a particular embodiment, the invention relates to a process for treating an aqueous solution (A) of a process for producing a compound of formula (I):

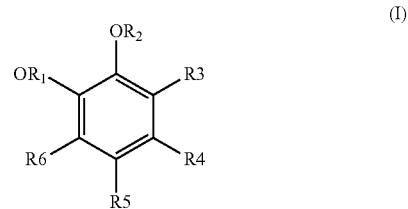

in which R1, R2, R3, R4, R5 and R6 are as defined previously, said process being characterized in that it comprises:

at least one step (i) of recovery of the solid sulfate salt (S) in at least partially anhydrous form to recover the solid sulfate salt (S) separately from the aqueous solution (A), said step (i) comprising a step of at least partial separation of the sulfate ions in the form of an at least partially anhydrous solid salt from the aqueous solution (A), the recovery of a solution (A-S) which has undergone the step of at least partial separation of the sulfate ions, at least one step (ii) of removal or separation of the aromatic organic compounds (O) from the aqueous solution (A) to remove or separate the organic compounds (O) from the aqueous solution (A), and the recovery of a solution (A-O) which has undergone step (ii) of at least partial separation or removal of the aromatic organic compounds, said process comprising the implementation at least once of said step (i) and of said step (ii), independently of the order, in order finally to recover an aqueous solution (A-O—S) in which the sulfate salt (S) and the aromatic organic compounds (O) have been at least partially removed or separated.

The invention covers the repetition of steps (i) and (ii), independently of their order, each possibly being performed successively, and/or repeatedly.

According to an advantageous variant, step (ii) of removal or separation of the aromatic organic compounds (O) is performed before step (i) of recovery of the solid sulfate salt (S) in at least partially anhydrous form.

According to another variant, step (ii) of removal or separation of the aromatic organic compounds (O) is performed after step (i) of recovery of the solid sulfate salt (S) in at least partially anhydrous form.

According to another variant, at least one step (ii) of removal or separation of the aromatic organic compounds (O) is performed before a step (i) of recovery of the solid sulfate salt (S) in at least partially anhydrous form and at least one step (ii) is performed after step (i).

According to an advantageous variant, steps (i) and (ii) are performed in a single step. Thus, the invention covers a process comprising at least one step of recovery of the solid sulfate salt (S) in anhydrous form and of removal or separation of the aromatic organic compounds. Such a variant may comprise or consist of incineration or heat treatment at high temperature (above 250° C. and preferably above 300° C.) removing the aqueous solution (A) and at least partially the organic compounds (O), and recovery of a solid sulfate $SO_4^{2-}$ salt (S) in anhydrous form.

Preferably, step (ii) of removal of the aromatic organic compounds (O) comprises an oxidation treatment of the aromatic organic compounds (O) to non-aromatic organic compounds (NA), for example up to the production of CO2, in the presence of an oxidizing agent, which is preferably H2O2, but which may be another oxidizing agent such as oxygen, said oxidation treatment preferably being performed in the presence of UV.

It is preferred to perform said oxidation step via an advanced oxidation process (AOP) in the presence of O2 and/or of H2O2 and of UV or a Fenton treatment comprising the oxidation of the aromatic organic compounds (O) to non-aromatic organic compounds (NA), for example up to the production of CO2, in the presence of an oxidizing agent and optionally of iron(II) and/or iron(III).

According to an advantageous variant, step (ii) of removal of the aromatic organic compounds (O) comprises a biotreatment by placing the aromatic organic compounds (O) in contact with bacteria or enzymes that degrade said aromatic organic compounds (O). Among the bacteria and enzymes that may be used, mention may be made, in a non-exhaustive manner, of: *Pseudomonas putida, Pseudomonas mendocina, Pseudomonas putida, Comonas, Anthrobacter* sp., *Aspergillus niger*, mandelate dehydrogenase, benzoyl decarboxylase, vanillyl dehydrogenase, toluene monooxygenase, catechol-1,2-dioxygenase, catechol-2,3-dioxygenase, procatechuate-3,4-dioxygenase, procatechuate decarboxylase, etc.

According to another advantageous variant, step (ii) of removal or separation of the aromatic organic compounds (O) comprises a step of absorption of the aromatic organic compounds onto a substrate, for instance active charcoal.

According to another advantageous variant, step (ii) of removal or separation of the aromatic organic compounds (O) may comprise one or more liquid/liquid extractions.

These variants may be combined to optimally remove or separate the aromatic organic compounds (O).

According to one embodiment, the process may comprise a step of adjusting the pH of the aqueous solution (A) to a value of less than 7 and preferably between 2 and 6.

According to one embodiment, the process comprises a step of adjusting the pH of the aqueous solution (A) to a value of greater than 8 and preferably between 9 and 12.

The invention preferably covers a process comprising:
a1) optionally, adjustment of the pH of the aqueous solution (A) comprising at least one dissolved sulfate $SO_4^{2-}$ salt and at least one aromatic organic compound, to a value of less than 7 and preferably between 2 and 6,
b1) removal or separation of the aromatic organic compounds (O) via at least one oxidation treatment of the aromatic organic compounds (O) to non-aromatic organic compounds (NA), for example up to the production of CO2, in the presence of an oxidizing agent, which is preferably H2O2, or via at least one treatment of absorption onto a substrate, for example onto active charcoal, to obtain a solution (A-O),
c1) concentration of the sulfate ions in the solution (A-O) derived from step b1), crystallization/precipitation of the solid sulfate salt (S) in at least partially anhydrous form at a temperature above the solubility limit temperature of the sulfate salt in the aqueous solution (A-O), separation and recovery of the at least partially anhydrous solid sulfate salt (S), and recovery of a solution (A-O—S),
d1) optionally, removal or separation of the residual aromatic organic compounds (O) in the aqueous solution (A-O—S) derived from step c1) via a biotreatment by placing the residual aromatic organic compounds (O) in contact with bacteria that degrade said aromatic organic compounds (O), or removal or separation of the residual aromatic organic compounds (O) in the aqueous solution (A-O—S) derived from step c1) via at least one oxidation treatment of the aromatic organic compounds (O) to non-aromatic organic compounds (NA), for example up to the production of CO2, in the presence of an oxidizing agent, which is preferably H2O2,
e1) optionally, adjustment of the pH of the aqueous solution (A-O—S) derived from step c1), optionally d1), to a value of between 6 and 8.

Advantageously, step (c1) of crystallization/precipitation of the sulfate salt optionally comprises evaporation-concentration of the aqueous solution and crystallization of the sulfate salt. Evaporation-concentration of the aqueous solution and crystallization of the sulfate salt may be performed in a single step. Advantageously, one or more treatments for removal or separation of the aromatic organic compounds (O) may be envisaged between the evaporation and the crystallization of the sulfate salt.

The invention also covers a process comprising:
a2) optionally, adjustment of the pH of the aqueous solution (A) comprising at least one dissolved sulfate $SO_4^{2-}$ salt and at least one aromatic organic compound, to an acidic, basic or neutral pH value,
b2) concentration of the sulfate ions in the aqueous solution (A), crystallization/precipitation of the solid sulfate salt (S) in at least partially anhydrous form at a temperature above the solubility limit temperature of the sulfate salt in the aqueous solution (A), separation and recovery of the at least partially anhydrous solid sulfate salt (S), and recovery of a solution (A-S),
c2) removal or separation of the aromatic organic compounds (O) from the solution (A-S) derived from step b2) via at least one oxidation treatment of the aromatic organic compounds (O) to non-aromatic organic compounds (NA), for example up to the production of CO2, in the presence of an oxidizing agent, which is preferably H2O2, or via at least one treatment of adsorption onto a substrate, for example onto active charcoal, and recovery of a solution (A-O—S), and
d2) optionally, adjustment of the pH of the aqueous solution (A-O—S) derived from step c2), to a value of between 6 and 8.

The invention also covers a process comprising:
a3) optionally, adjustment of the pH of the aqueous solution (A) comprising at least one dissolved sulfate $SO_4^{2-}$ salt and at least one aromatic organic compound, to an acidic, basic or neutral pH value,
b3) concentration of the sulfate ions in the aqueous solution (A), crystallization/precipitation of the solid sulfate salt (S) in at least partially anhydrous form at a temperature above the solubility limit temperature of the sulfate salt in the aqueous solution (A),
c3) recovery of an aqueous solution comprising a solid sulfate salt (S) in at least partially anhydrous form,
d3) incineration or heat treatment at high temperature (above 250° C. and preferably above 300° C.) of the aqueous solution derived from step c3) to remove the water from the aqueous solution (A) and, at least partially, the organic compounds (O), and recovery of a solid sulfate $SO_4^{2-}$ salt (S) in anhydrous form.

According to one variant, said process optionally comprises in step c3) the separation of the at least partially anhydrous solid sulfate salt (S) from the aqueous solution to obtain a solution concentrated to more than 40% and preferably to more than 45%, by weight of sulfate salt, and the incineration or heat treatment at high temperature (above 250° C. and preferably above 300° C.) of the concentrated solution to remove the water and, at least partially, the organic compounds (O), and the recovery of a solid sulfate $SO_4^{2-}$ salt in anhydrous form.

According to another variant, said process optionally comprises in step c3) the separation of the at least partially anhydrous solid sulfate salt (S) from the aqueous solution to obtain, firstly, a solution concentrated to more than 40% and preferably to more than 45%, by weight of sulfate salt, and, secondly, a less concentrated solution containing less than 40% sulfate salt, followed by the separation of the at least partially anhydrous solid sulfate salt (S) from the concentrated solution to recover a solid sulfate $SO_4^{2-}$ salt (S) in anhydrous form, and the incineration or heat treatment at high temperature (above 250° C. and preferably above 300° C.) of the less concentrated solution to remove the water and, at least partially, the organic compounds (O), and the recovery of a solid sulfate $SO_4^{2-}$ salt in anhydrous form.

The present invention is particularly advantageous since a process for the industrial production of dihydroxylated benzene derivatives, and in particular of vanillin, ethylvanillin or derivatives thereof of formula (I), may generate an amount of effluents of several tons per hour. Thus, the upgrading according to the invention of the sulfate salt(s), and in particular of sodium sulfate, limits the process costs and even makes it possible to upgrade less expensively this or these salts co-produced during the synthesis of dihydroxylated benzene derivatives, and in particular of vanillin, ethylvanillin or derivatives thereof of formula (I). Moreover, the process of the invention is ecologically advantageous since it removes the aromatic organic compounds, for example up to the production of CO2, upgrades the sulfate salts in purified solid form, and optionally produces a purified aqueous effluent, generally in the form of industrial water or of water that can be discharged according to the standards in force.

According to one variant of the invention, the separated aromatic organic compounds are upgraded or used subsequently. For example, after adsorption, the aromatic organic compounds are desorbed, preferably with regeneration of the adsorbent used.

EXAMPLES

The percentages are given on a weight basis, relative to the total weight of the composition. The temperatures are given in degrees Celsius (° C.).

Example 1

Adsorption, Concentration and Isolation of Anhydrous Na2SO4 and Fenton Treatment of the Filtrate 100 L/hour of aqueous effluent obtained from the process for synthesizing vanillin from glyoxylic acid (COD=9 g/L, Na2SO4 content of 8.5%) are introduced onto a column containing BGX charcoal (purchased from CECA) and maintained at 60° C.; the residence time is 1 hour. The pH may be neutral, acidic or basic depending on the charcoal used. This effluent contains dissolved sodium sulfate and various aromatic organic compounds. An effluent with a COD of 3.9 g/L is obtained at the outlet of this column, thus illustrating the separation of a large amount of aromatic organic compounds, which may be either discarded or recovered by regeneration of the column via a suitable treatment.

The aqueous solution containing the dissolved sulfate is then concentrated in a multi-effect (triple-effect) evaporator until the volume reaches 33 L/hour. The solution thus concentrated especially in sulfate ions is sent to a crystallizer at 60° C. and then to a thickener which makes it possible to generate:

an aqueous solution which is recycled into the crystallizer (7.2 L/hour, containing 31% Na2SO4), an aqueous solution that is highly concentrated in sulfate ions (containing 85% Na2SO4), referred to as a "slurry".

The slurry is sent to a vacuum filtration unit at 60° C. which makes it possible to separate 8.1 kg of anhydrous sodium sulfate in the form of a white solid (cake) per 100 L of effluent. The anhydrous sodium sulfate may be upgraded in its existing form, advantageously without further treatment.

The aqueous solution recovered at the outlet of the vacuum filtration unit, known as the mother liquor or filtrate, is combined with the water evaporated from the triple-effect evaporator and from the crystallizer to generate a stream of 91 L having a COD of 3.4 g/L, which is treated continuously in a reactor at 80° C. for 5 hours with 2000 g/hour of 30 w/vv % of aqueous hydrogen peroxide solution and 100 g/hour of iron(II) sulfate heptahydrate. This treatment makes it possible to obtain an aqueous solution with a COD of 265 mg/L and 5000 ppm of Na2SO4.

Example 2

Oxidation Treatment, Concentration and Isolation of Anhydrous Na2SO4 and Biotreatment of the Filtrate 100 L/hour of aqueous effluent, containing dissolved sodium sulfate and various aromatic organic compounds, obtained from the process for synthesizing vanillin from glyoxylic acid (COD=10 g/L, Na2SO4 content of 5.7%) is pretreated with sulfuric acid to bring the pH to 5 and then treated at 60° C. in a UV reactor (equipped with a low-pressure mercury lamp of power 18 W) by addition of 30 w/vv % aqueous hydrogen peroxide solution (in this example there is no addition of ferrous sulfate, but it is possible to do so). Addition of 1.4 molar equivalents of 30% H2O2 makes it possible to reduce the COD to 1.5 g/L. This aqueous solution is then concentrated in a multi-effect (triple-effect) evaporator until the volume reaches 34 L/hour. The solution thus concentrated is sent to a crystallizer at 60° C. and then to a thickener which makes it possible to generate:

an aqueous solution which is recycled into the crystallizer (6.7 L/hour, containing 31% Na2SO4), an aqueous solution that is highly concentrated in sulfate ions, referred to as a "slurry".

The slurry is sent to a vacuum filtration unit at 60° C. which makes it possible to separate 5.2 kg of anhydrous sodium sulfate in the form of a white solid (cake) per 100 L of effluent. The anhydrous sodium sulfate may be upgraded in its existing form, advantageously without further treatment.

The aqueous solution recovered at the outlet of the vacuum filtration unit, known as the mother liquor or filtrate, is combined with the water evaporated from the triple-effect evaporator and from the crystallizer to generate a stream of 94.5 L having a COD of 0.94 g/L, which is treated continuously biochemically using microbial strains. The resulting COD is 285 mg/L and 6000 ppm of $Na_2SO_4$.

Example 3

Concentration and Isolation of Anhydrous $Na_2SO_4$

100 L/hour of aqueous effluent, containing dissolved sodium sulfate and various aromatic organic compounds, obtained from the process for synthesizing vanillin from glyoxylic acid (COD=7 g/L, $Na_2SO_4$ content of 4%) is placed in a multi-effect (triple-effect) evaporator and concentrated until the volume reaches 35 L/hour. The solution thus concentrated especially in sulfate ions is sent to a crystallizer at 60° C. and then to a thickener which makes it possible to generate:

an aqueous solution which is recycled into the crystallizer (5.0 L/hour, containing 31% $Na_2SO_4$), an aqueous solution that is highly concentrated in sulfate ions (containing 78% $Na_2SO_4$), referred to as a "slurry".

The slurry is sent to an incinerator at 500° C. for a time sufficient to degrade the aromatic organic compounds, which allows the recovery of 4 kg of anhydrous sodium sulfate in the form of an essentially white solid per 100 L of effluent. Slag may be present and removed according to the knowledge of a person skilled in the art (dryer, etc.) to obtain the solid white salt.

The anhydrous sodium sulfate may be upgraded in its existing form, advantageously without further treatment.

This treatment makes it possible to avoid the subsequent treatment and the discharge of an aqueous solution.

Example 4

Concentration and Isolation of $Na_2SO_4$

100 L/hour of aqueous effluent, containing dissolved sodium sulfate and various aromatic organic compounds, obtained from the process for synthesizing vanillin from glyoxylic acid (COD=7 g/L, $Na_2SO_4$ content of 4%) is placed in a multi-effect (triple-effect) evaporator and concentrated until the volume reaches 35 L/hour. The solution thus concentrated especially in sulfate ions is sent to a crystallizer at 60° C. and then to a thickener which makes it possible to generate:

an aqueous solution which is recycled into the crystallizer (5.0 L/hour, containing 31% $Na_2SO_4$), an aqueous solution that is highly concentrated in sulfate ions (containing 78% $Na_2SO_4$), referred to as a "slurry".

The slurry is sent to a vacuum filtration unit at 60° C. which makes it possible to separate 3.6 kg of anhydrous sodium sulfate in the form of a white solid (cake) per 100 L of effluent. The anhydrous sodium sulfate may be upgraded in its existing form, advantageously without further treatment.

The aqueous solution recovered at the outlet of the vacuum filtration unit, referred to as the mother liquor or filtrate, is sent to an incinerator at 500° C. for a time sufficient to degrade the aromatic organic compounds, which makes it possible to recover 0.4 kg of essentially white anhydrous sodium sulfate. Slag may be present and removed according to the knowledge of a person skilled in the art (dryer, etc.).

Example 5

Adsorption, Concentration and Isolation of Anhydrous $Na_2SO_4$

100 L/hour of aqueous effluent obtained from the process for synthesizing vanillin from glyoxylic acid (COD=8 g/L, $Na_2SO_4$ content of 9%) are introduced onto a column containing BGX charcoal (purchased from CECA) and maintained at 60° C.; the residence time is 1 hour. The pH may be neutral, acidic or basic depending on the charcoal used. This effluent contains dissolved sodium sulfate and various aromatic organic compounds. An effluent with a COD of 3.5 g/L is obtained at the outlet of this column, thus illustrating the separation of a large amount of aromatic organic compounds, which may be either discarded or recovered by regeneration of the column via a suitable treatment.

The aqueous solution containing the dissolved sulfate is then concentrated in a multi-effect (triple-effect) evaporator until the volume reaches 33 L/hour. The solution thus concentrated especially in sulfate ions is sent to a crystallizer at 60° C. and then to a thickener which makes it possible to generate:

an aqueous solution which is recycled into the crystallizer (7.2 L/hour, containing 31% $Na_2SO_4$), an aqueous solution that is highly concentrated in sulfate ions (containing 85% $Na_2SO_4$), referred to as a "slurry".

The slurry is sent to a vacuum filtration unit at 60° C. which makes it possible to separate 8.6 kg of anhydrous sodium sulfate in the form of a white solid (cake) per 100 L of effluent.

The anhydrous sodium sulfate may be upgraded in its existing form, advantageously without further treatment.

The aqueous solution recovered at the outlet of the vacuum filtration unit, referred to as the mother liquor or filtrate, is incinerated at a temperature above 300° C. The aqueous stream derived from the evaporation-concentration section and from the crystallizer is 91 L and has a COD of 300 mg/L and no sulfate.

Example 6

Oxidation Treatment, Concentration and Isolation of Anhydrous $Na_2SO_4$

100 L/hour of aqueous effluent, containing dissolved sodium sulfate and various aromatic organic compounds, obtained from the process for synthesizing vanillin from glyoxylic acid (COD=9.5 g/L, $Na_2SO_4$ content of 6.5%) is pretreated with sulfuric acid to bring the pH to 5 and then treated at 50° C. in a UV reactor (equipped with a low-pressure mercury lamp of power 18 W) by addition of 30 w/w % aqueous hydrogen peroxide solution (in this example there is no addition of ferrous sulfate, but it is possible to do so). Addition of 0.8 molar equivalent of 30% $H_2O_2$ (/COD) makes it possible to reduce the COD to 2 g/L.

This aqueous solution is then concentrated in a multi-effect (triple-effect) evaporator until the volume reaches 35 L/hour. The solution thus concentrated is sent to a crystallizer at 60° C. and then to a thickener which makes it possible to generate:

an aqueous solution which is recycled into the crystallizer (8 kg/hour), an aqueous solution that is highly concentrated in sulfate ions, referred to as a "slurry".

The slurry is sent to a vacuum filtration unit at 60° C. which makes it possible to separate 5.9 kg of anhydrous sodium sulfate in the form of a white solid (cake) per 100 L of effluent. The anhydrous sodium sulfate may be upgraded in its existing form, advantageously without further treatment.

The aqueous solution recovered at the outlet of the vacuum filtration unit, referred to as the mother liquor or filtrate, is incinerated at a temperature above 300° C. The aqueous stream derived from the evaporation-concentration section and from the crystallizer is 93.5 L and has a COD of 350 mg/L and no sulfate.

The invention claimed is:

1. A process for treating an aqueous solution (A) derived from a process for producing a compound of formula (I):

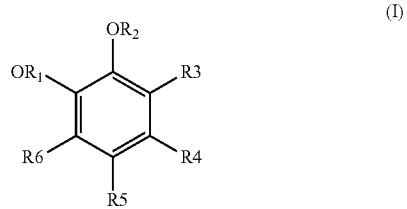

wherein R1 and R2 are identical or different and selected from the group consisting of hydrogen and C1-C5 alkyl, or R1 and R2 together form a methylene group, and wherein R3, R4, R5 and R6, which are identical or different, are independently selected from the group consisting of: a hydrogen atom, a hydroxyl group (—OH), an alkoxy group (—OR), an alcohol group (—ROH), an aldehyde group (—CHO), a ketone group (—C(=O)R), an acid group (—COOH), a nitrile group (—CN), and a linear or branched, saturated or unsaturated C1-C6 alkyl chain, optionally comprising one or more substituents in an end or side position or one or more functions in said alkyl chain, R being a C1-C5 alkyl, wherein an aqueous solution (A) comprises at least one dissolved sulfate $SO_4^{2-}$ salt (S) and at least one aromatic organic compound (O) formed during the process for producing said compound (I), and wherein said treating process comprises at least one step (i) of recovery of a solid sulfate salt (S) in at least partially anhydrous form separately from the aqueous solution (A), and comprises at least one step (ii) of separation or removal of the at least one aromatic organic compound (O) from the aqueous solution (A), said treating process comprising implementing at least once said step (i) and said step (ii) in order to at least partially separate the at least one aromatic organic compound (O) and the sulfate salt $SO_4^{2-}$ (S) from the aqueous solution (A);

wherein said step (ii) of removal or separation of the at least one aromatic organic compound (O) is performed before said step (i) of recovery of the solid sulfate salt (S) in at least partially anhydrous form, and wherein the at least one aromatic organic compound (O) comprises a dimer or oligomer of a compound of formula (I).

2. The process as claimed in claim 1, wherein said step (i) of recovery of the solid sulfate salt (S) in at least partially anhydrous form comprises the concentration (ia) of the sulfate ions in said aqueous solution (A) by removal or separation of at least some of the water from the aqueous solution (A), said concentration (ia) being performed at a temperature above the solubility limit temperature of the sulfate salt in the aqueous solution (A).

3. The process as claimed in claim 2, wherein the temperature of the aqueous solution (A) is at a production end temperature before treatment, of greater than 40° C., and wherein the concentration (ia) is performed at the production end temperature plus or minus 20° C. but greater than 40° C.

4. The process as claimed in claim 1, wherein said step (i) of recovery of the solid sulfate salt (S) in at least partially anhydrous form comprises: (ia) concentration of the sulfate ions in the aqueous solution (A), (ib) crystallization/precipitation of the solid sulfate salt (S) in at least partially anhydrous form, (ic) separation of the at least partially anhydrous solid sulfate salt (S) from the aqueous solution (A), and (id) recovery of the at least partially anhydrous solid sulfate salt (S), said steps (ia), (ib) and (ic) being performed at a temperature above the solubility limit temperature of the sulfate salt in the aqueous solution (A).

5. The process as claimed in claim 1, comprising:
at least one step (i) of recovery of the solid sulfate salt (S) in at least partially anhydrous form to recover the solid sulfate salt (S) separately from the aqueous solution (A), said step (i) comprising a step of at least partial separation of the sulfate ions in the form of an at least partially anhydrous solid salt from the aqueous solution (A),
the recovery of a solution (A-S) which has undergone the step of at least partial separation of the sulfate ions,
at least one step (ii) of removal or separation of the at least one aromatic organic compound (O) from the aqueous solution (A) to remove or separate the at least one aromatic organic compound (O) from the aqueous solution (A), and
the recovery of a solution (A-O) which has undergone step (ii) of at least partial separation or removal of the aromatic organic compounds,
said treating process comprising implementing at least once said step (i) and said step (ii), in order finally to recover an aqueous solution (A-O—S) in which the sulfate salt (S) and the at least one aromatic organic compound (O) have been at least partially removed or separated;
wherein said step (ii) of removal or separation of the at least one aromatic organic compound (O) is performed before said step (i) of recovery of the solid sulfate salt (S) in at least partially anhydrous form.

6. The process as claimed in claim 1, wherein said step (ii) of removal or separation of the at least one aromatic organic compound (O) comprises an oxidation treatment of the at least one aromatic organic compound (O) to non-aromatic organic compounds (NA), in the presence of an oxidizing agent.

7. The process as claimed in claim 1, wherein said step (ii) of removal or separation of the at least one aromatic organic compound (O) comprises a biotreatment by placing the at least one aromatic organic compound (O) in contact with bacteria that degrade said at least one aromatic organic compound (O).

8. The process as claimed in claim 1, wherein said step (ii) of removal or separation of the at least one aromatic organic compound (O) comprises a step of absorption of the at least one aromatic organic compound onto a substrate.

9. The process as claimed in claim 1, comprising a step of adjusting the pH of the aqueous solution (A) to a value of less than 7.

10. The process as claimed in claim 1, comprising:
a1) optionally, adjustment of the pH of the aqueous solution (A) comprising at least one dissolved sulfate $SO_4^{2-}$ salt and at least one aromatic organic compound, to a value of less than 7,
b1) removal or separation of the at least one aromatic organic compound (O) via at least one oxidation treatment of the at least one aromatic organic compound (O) to non-aromatic organic compounds (NA), in the presence of an oxidizing agent, or via at least one treatment of absorption onto a substrate, to obtain a solution (A-O),
c1) concentration of the sulfate ions in the solution (A-O) derived from said step b1), crystallization/precipitation of the solid sulfate salt (S) in at least partially anhydrous form at a temperature above the solubility limit temperature of the sulfate salt in the aqueous solution (A-O), separation and recovery of the at least partially anhydrous solid sulfate salt (S), and recovery of a solution (A-O—S),
d1) optionally, removal or separation of residual aromatic organic compound (O) in the aqueous solution (A-O—S) derived from said step c1) via a biotreatment by placing the residual aromatic organic compound (O) in contact with bacteria that degrade said aromatic organic compound (O), or removal or separation of the residual aromatic organic compound (O) in the aqueous solution (A-O—S) derived from said step c1) via at least one oxidation treatment of the at least one aromatic organic compound (O) to non-aromatic organic compounds (NA), in the presence of an oxidizing agent, and
e1) optionally, adjustment of the pH of the aqueous solution (A-O—S) derived from said step c1), optionally said step d1), to a value of between 6 and 8.

11. The process as claimed in claim 1, comprising:
a2) optionally, adjustment of the pH of the aqueous solution (A) comprising at least one dissolved sulfate $SO_4^{2-}$ salt and at least one aromatic organic compound, to an acidic, basic or neutral pH value,
b2) concentration of the sulfate ions in the aqueous solution (A), crystallization/precipitation of the solid sulfate salt (S) in at least partially anhydrous form at a temperature above the solubility limit temperature of the sulfate salt in the aqueous solution (A), separation and recovery of the at least partially anhydrous solid sulfate salt (S), and recovery of a solution (A-S),
c2) removal or separation of the at least one aromatic organic compound (O) from the solution (A-S) derived from said step b2) via at least one oxidation treatment of the at least one aromatic organic compound (O) to non-aromatic organic compounds, in the presence of an oxidizing agent, or via at least one treatment of adsorption onto a substrate, and recovery of a solution (A-O—S), and
d2) optionally, adjustment of the pH of the aqueous solution (A-O—S) derived from said step c2) to a value of between 6 and 8.

12. The process as claimed in claim 1, comprising:
a3) optionally, adjustment of the pH of the aqueous solution (A) comprising at least one dissolved sulfate $SO_4^{2-}$ salt and at least one aromatic organic compound, to an acidic, basic or neutral pH value,
b3) concentration of the sulfate ions in the aqueous solution (A), crystallization/precipitation of the solid sulfate salt (S) in at least partially anhydrous form at a temperature above the solubility limit temperature of the sulfate salt in the aqueous solution (A),
c3) recovery of an aqueous solution comprising a solid sulfate salt (S) in at least partially anhydrous form, and
d3) incineration or heat treatment at a temperature above 250° C., of the aqueous solution derived from said step c3) to remove the water from the aqueous solution (A) and, at least partially, the at least one aromatic organic compound (O), and recovery of a solid sulfate $SO_4^{2-}$ salt (S) in anhydrous form.

13. The process as claimed in claim 6, wherein said oxidation step is an oxidation treatment performed in the presence of UV or a Fenton treatment, in the presence of an oxidizing agent and optionally of iron(II) and/or iron(III).

14. The process as claimed in claim 1, wherein the compound of formula (I) of the at least one aromatic organic compound (O) is vanillin or ethylvanillin.

15. A process for purifying a sulfate salt in solid form and for purifying an effluent from a process for producing a compound of formula (I):

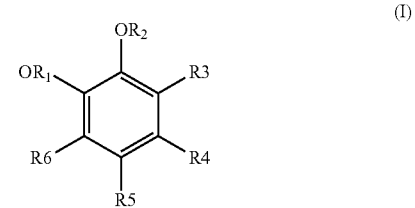

wherein R1 and R2 are identical or different and selected from the group consisting of hydrogen and C1-C5 alkyl, or R1 and R2 together form a methylene group, and wherein R3, R4, R5 and R6, which are identical or different, are independently selected from the group consisting of: a hydrogen atom, a hydroxyl group (—OH), an alkoxy group (—OR), an alcohol group (—ROH), an aldehyde group (—CHO), a ketone group (—C(═O)R), an acid group (—COOH), a nitrile group (—CN), and a linear or branched, saturated or unsaturated C1-C6 alkyl chain, optionally comprising one or more substituents in an end or side position or one or more functions in said alkyl chain, R being a C1-C5 alkyl,
wherein said effluent is an aqueous solution (A) comprising at least one dissolved sulfate salt $SO_4^{2-}$ and at least one aromatic organic compound (O) formed during the process for producing compound (I),
said purifying process comprising at least one step (i) of recovery of a solid sulfate salt (S) in at least partially anhydrous form separately from the aqueous solution (A), and at least one step (ii) of separation or removal of the at least one aromatic organic compound (O) from the aqueous solution (A);
wherein said step (ii) of removal or separation of the at least one aromatic organic compound (O) is performed before said step (i) of recovery of the solid sulfate salt (S) in at least partially anhydrous form, and
wherein the at least one aromatic organic compound (O) comprises a dimer or oligomer of a compound of formula (I).

16. The process as claimed in claim 15, wherein the at least one step (ii) of separation or removal of the at least one aromatic organic compound (O) from the aqueous solution (A) comprises absorption of the at least one aromatic organic compound (O) onto active charcoal.

* * * * *